April 27, 1943.  V. D. ACKERMAN  2,317,577

PISTON EXPANDER

Filed Feb. 12, 1942

INVENTOR.
Virgil D. Ackerman
BY
Earl & Chappell

Patented Apr. 27, 1943

2,317,577

UNITED STATES PATENT OFFICE 2,317,577

PISTON EXPANDER

Virgil D. Ackerman, Hastings, Mich., assignor to Hastings Manufacturing Company, Hastings, Mich., a corporation of Michigan Application February 12, 1942, Serial No. 430,563

2 Claims. (Cl. 309—12)

This invention relates to improvements in piston expanders.

The main objects of this invention are:

First, to provide a piston expander which is well adapted for pistons having non-split piston skirts and is very effective when used in cast iron and steel pistons although also desirable for use in aluminum or alloy pistons.

Second, to provide a piston expander in which the expander members are provided with curved piston wall engaging portions of substantial area for engagement of the piston wall axially thereof having a snubbing action in relation to the piston wall and to each other, thereby while securing the desired expanding action prevents the undesired "breathing" action even in thin walled iron or steel pistons.

Third, to provide a piston expander having these advantages which is easily installed and very effectively retained.

Objects relating to details and economies of the invention will appear from the description to follow. The invention is defined in the claims.

Preferred embodiments of the invention are illustrated in the accompanying drawing, in which.

Figure 1:
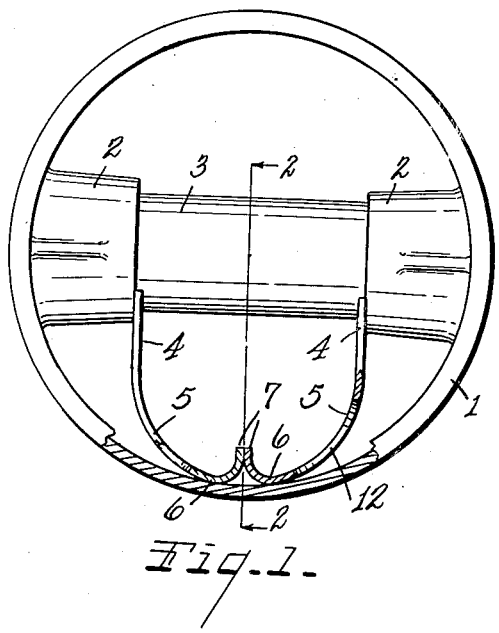
Fig. 1 is an inverted view of a non-split type of internal combustion engine piston with an expander embodying my invention installed therein, the piston and the expander being partially sectioned and partially broken away, the section being on line 1—1 of Fig. 2.

In the accompanying drawing, 1 represents an internal combustion engine piston of the non-split type, 2 the internal piston pin bosses and 3 the piston pin.

The expander of my invention comprises a pair of relatively wide blade-spring members 4 of substantial width. These expander members 4 are provided with inwardly curved portions 5 at their outer ends which merge into curved piston wall engaging portions 6, these piston wall engaging portions terminating in inturned mutually abutting and supporting ends 7 or inturned flange portions 7 which lie in side by side frictional abutting relation.

The curved piston wall engaging portions are of substantial area and engage with the piston wall axially thereof. In this embodiment illustrated, the piston wall engaging portions extend approximately the full length of the piston skirt, as shown in Fig. 2.

Figure 3:
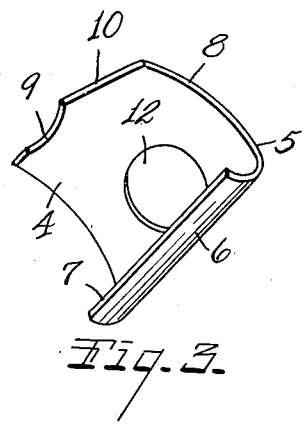
Fig. 3 is a perspective view of one of the expander members of the embodiment shown in Figs. 1 and 2.
Figure 2:
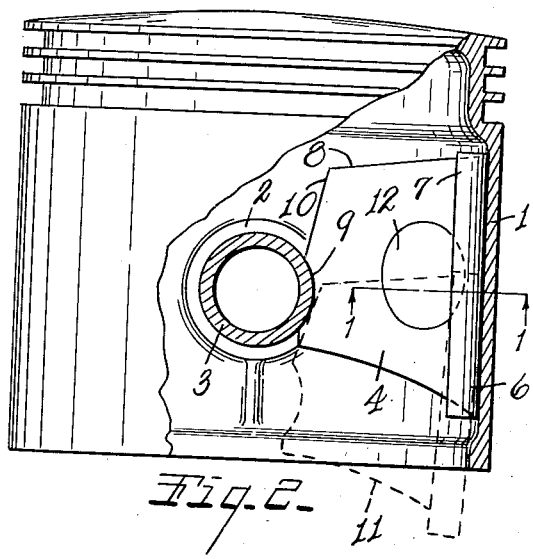
Fig. 2 is a fragmentary side elevation of the structure shown in Fig. 1 partially in longitudinal section on line 2—2 of Fig. 1, one of the steps of assembling the expander being indicated by dotted lines.

The longitudinal edges 8 of the expander members preferably converge inwardly while the expander members are provided with curved seats 9 of substantial depth engageable with the piston pin in an embodiment such as shown in Figs. 1, 2 and 3.

The inner edges 10 of the expander members incline upwardly from these seats so that the members positioned side by side—that is, with their abutment portions in engagement, may be driven into the piston, the expander members being initially positioned as shown by dotted lines 11 in Fig. 2.

It will be noted that the piston wall engaging areas of the expander members lie within the planes of their outer ends so that when the members are driven into position, they are not only put under expanding stress but their portions 7 urged against one another. When this is installed, a very substantial snubbing action results not only between the piston wall engaging surfaces of the expander members but also between their abutting and supporting ends 7. This is a very desirable feature and it very substantially reduces objectionable "breathing" action which results from some expanders when used in thin walled pistons particularly steel or cast iron as the piston is reciprocated in worn cylinders where the diameter varies during the stroke of the piston. The piston is, however, effectively expanded or resized.

The holes 12 are for the purpose of lightening the expander and also securing the desired spring tension.

My invention also has the further advantage that the expanders are very durable—that is, they are not likely to break through undesirable stresses therein or through crystallization which may result where the "breathing" action referred to is present.

In the embodiment shown in Figs. 1, 2 and 3, the expander members engage the piston pins and the piston pin bosses constitute side abutments. However, in some pistons it is desirable that the expander members shall engage the piston pin bosses.

It is believed that the embodiment of my invention illustrated will enable those skilled in the art to adapt my invention to pistons differing somewhat in structural details. The piston illustrated is of a type very widely used.

Expanders embodying my invention are easily and quickly installed and very securely retained in installed position, and as stated, do not subject the piston to the objectionable "breathing" of the expanding and contracting action as the piston travels in a worn cylinder.

Having thus described my invention, what I claim as new and desire to secure by Letters Patent, is:

1. A piston expander comprising a pair of oppositely disposed coacting blade spring expander members having inwardly curved piston wall engaging portions at their outer ends terminating in inturned mutually abutting and supporting ends, the inner edges of the expander members having curved piston pin seats of substantial depth engageable with a piston pin as an abutment therefor, the inner edges of the expander members at the inner sides of said seats being inclined to facilitate the expander members being driven into a piston to abuttingly engage said seats with a piston pin, with the inner ends of the expander members in supported engagement with the inner ends of the piston pin bosses of a piston, said expander members having converging curved portions at their outer ends extending a substantial portion of the length thereof and merging into said inwardly curved piston wall engaging portions, whereby when the expander is installed in a piston the expander members are placed under spring stress urging their outer ends toward each other with their said inturned ends in abutting thrust engagement, and their said piston wall engaging portions in spring thrust engagement with the piston wall.

2. A piston expander comprising a pair of oppositely disposed coacting blade spring expander members having inwardly curved piston wall engaging portions at their outer ends terminating in inturned mutually abutting and supporting ends, the inner edges of the expander members having seats adapted to abuttingly engage a piston pin with the inner ends of the expander members in supported lateral thrust engagement with the inner ends of the piston pin bosses of a piston, said expander members having converging curved portions at their outer ends extending a substantial portion of the length thereof, such curved portions merging into said inwardly curved piston wall engaging portions, whereby when the expander is installed in a piston the expander members are placed under spring stress urging their outer ends toward each other with their said inturned ends in abutting thrust engagement, and their said piston wall engaging portions in spring thrust engagement with the piston wall.

VIRGIL D. ACKERMAN.